United States Patent
Schultz et al.

(10) Patent No.: US 7,186,328 B1
(45) Date of Patent: Mar. 6, 2007

(54) PROCESS FOR THE REGENERATION OF AN ADSORBENT BED CONTAINING SULFUR OXIDATED COMPOUNDS

(75) Inventors: Michael A. Schultz, Chicago, IL (US); Ronald M. Gatan, Chicago, IL (US); Timothy A. Brandvold, Arlington Heights, IL (US); Christopher D. Gosling, Roselle, IL (US)

(73) Assignee: UOP LLC, Des Plaines, IL (US)

( * ) Notice: Subject to any disclaimer, the term of this patent is extended or adjusted under 35 U.S.C. 154(b) by 335 days.

(21) Appl. No.: 10/953,638

(22) Filed: Sep. 29, 2004

(51) Int. Cl.
*C10G 25/12* (2006.01)

(52) U.S. Cl. .................... 208/213; 208/305; 585/826; 210/670; 423/242.1

(58) Field of Classification Search ............ 208/208 R, 208/213, 245, 250, 299, 305; 585/820, 826; 95/135; 210/660, 670; 423/242.1
See application file for complete search history.

(56) References Cited

U.S. PATENT DOCUMENTS

| | | | | |
|---|---|---|---|---|
| 4,354,929 | A | * 10/1982 | Wessels et al. | 208/310 Z |
| 5,755,933 | A | * 5/1998 | Ognisty et al. | 202/158 |
| 6,277,271 | B1 | 8/2001 | Kocal | 208/212 |
| 6,482,314 | B1 * | 11/2002 | Khare | 208/244 |
| 6,482,316 | B1 * | 11/2002 | Bal | 208/299 |
| 2002/0009404 | A1 * | 1/2002 | Tsybulevskiy et al. | 423/244.04 |
| 2005/0109677 | A1 * | 5/2005 | Han et al. | 208/196 |
| 2005/0218040 | A1 | 10/2005 | Schultz et al. | |
| 2006/0180501 | A1 * | 8/2006 | Da Silva et al. | 208/208 R |

* cited by examiner

Primary Examiner—Frank M. Lawrence
(74) Attorney, Agent, or Firm—James C. Paschall

(57) ABSTRACT

A process for the cyclical regeneration of an adsorbent bed containing sulfur-oxidated compounds. The adsorbent bed is used to adsorb and separate sulfur-oxidated compounds from a hydrocarbonaceous stream to produce an adsorbent having adsorbed sulfur-oxidated compounds.

25 Claims, 1 Drawing Sheet

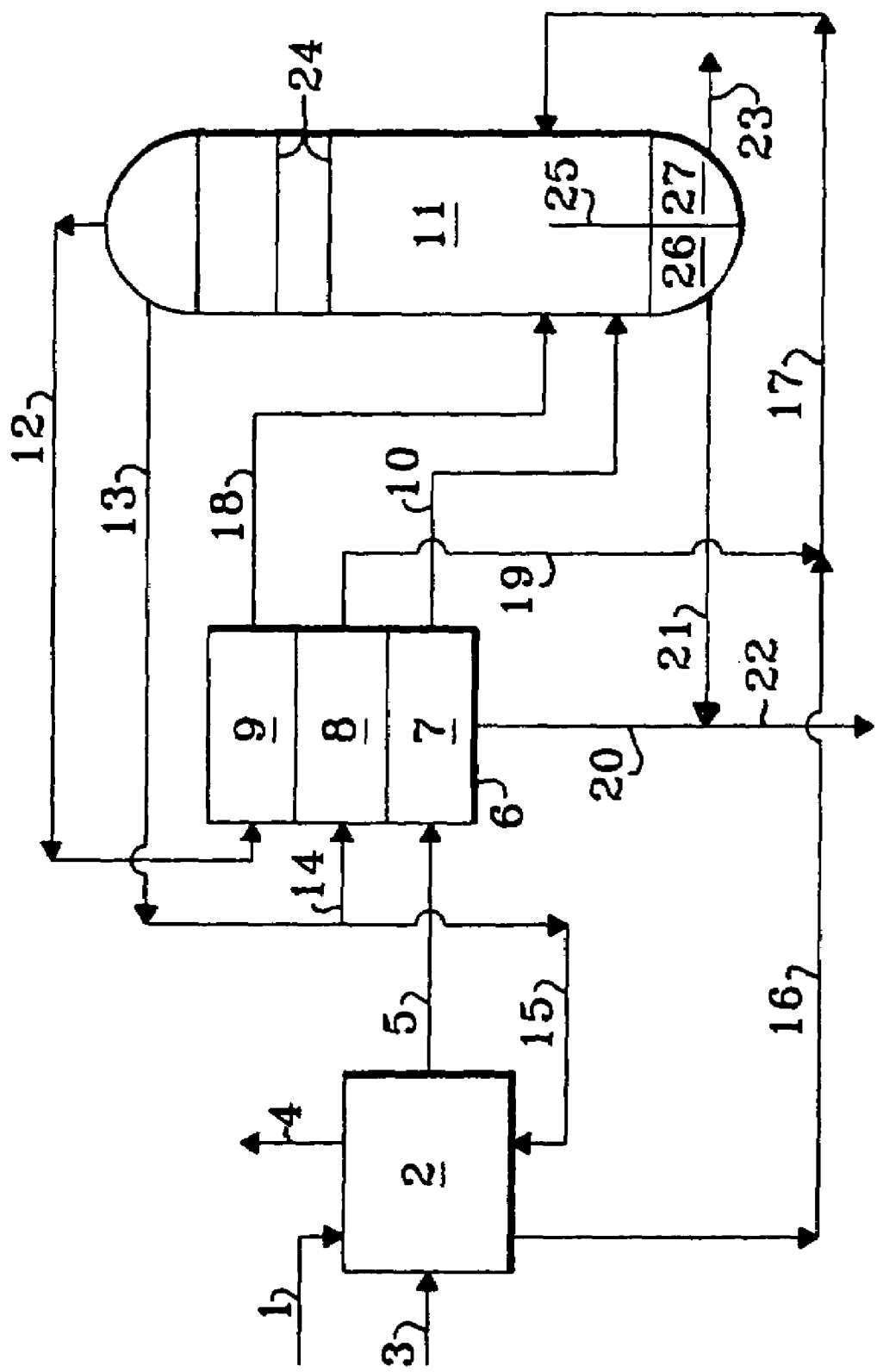

US 7,186,328 B1

PROCESS FOR THE REGENERATION OF AN ADSORBENT BED CONTAINING SULFUR OXIDATED COMPOUNDS

FIELD OF THE INVENTION

The field of art to which this invention pertains is the regeneration of adsorbents containing sulfur oxidated compounds.

BACKGROUND OF THE INVENTION

There is an increasing demand to reduce the sulfur content of hydrocarbonaceous oil to produce products which have very low concentrations of sulfur and are thereby marketable in the ever more demanding marketplace. With the increased environmental emphasis on the requirement for more environmentally friendly transportation fuels, those skilled in the art have sought to find feasible and economical techniques to reduce the sulfur content of hydrocarbonaceous oil to low concentrations.

Traditionally, hydrocarbons containing sulfur have been subjected to a catalytic hydrogenation zone to remove sulfur and produce hydrocarbons having lower concentrations of sulfur. Hydrogenation to remove sulfur is very successful for the removal of the sulfur from hydrocarbons that have sulfur components that are easily accessible to contact with the hydrogenation catalyst. However, the removal of sulfur components which are sterically hindered becomes exceedingly difficult and therefore the removal of sulfur components to a sulfur level below about 100 ppm is very costly by known current hydrotreating techniques. It is also known that a hydrocarbonaceous oil containing sulfur may be subjected to oxygenation to convert the hydrocarbonaceous sulfur compounds to compounds containing sulfur and oxygen, such as sulfoxide or sulfone for example, which have different chemical and physical characteristics.

Although the contrasting characteristics of hydrocarbons and the sulfoxides or sulfones would suggest the separation of the sulfur-oxidated compounds, there is a continuing need for a process to successfully isolate the sulfur-isolated compounds while maximizing the yield of sulfur-free hydrocarbons in a facile and economical manner. Fractionation of diesel boiling range hydrocarbons to isolate and recover sulfur-oxidated compounds is not possible because the sulfur-oxidated compounds boil within the same range as some of the diesel fraction. Adsorbents have a relatively low capacity on a weight basis and when large quantities of hydrocarbon feedstocks containing sulfur-oxidated compounds are to be separated, simple adsorption is not economically feasible.

INFORMATION DISCLOSURE

U.S. Pat. No. 6,277,271 B1 (Kocal) discloses a process for the desulfurization of a hydrocarbonaceous oil wherein the hydrocarbonaceous oil and a recycle stream containing sulfur-oxidated compounds is contacted with a hydrodesulfurization catalyst in a hydrodesulfurization reaction zone to reduce the sulfur level to a relatively low level and then contacting the resulting hydrocarbonaceous stream from the hydrodesulfurization zone with an oxidizing agent to convert the residual, low level of sulfur compounds into sulfur-oxidated compounds and the resulting hydrocarbonaceous oil stream containing the sulfur-oxidated compounds is separated to produce a stream containing the sulfur-oxidated compounds and a hydrocarbonaceous oil stream having a reduced concentration of sulfur-oxidated compounds. At least a portion of the sulfur-oxidated compounds is recycled to the hydrodesulfurization reaction zone.

U.S. patent application Ser. No. 10/813,250 filed Mar. 30, 2004, discloses a process for the removal of sulfur-oxidated compounds from a hydrocarbonaceous stream containing sulfur-oxidated compounds.

BRIEF SUMMARY OF THE INVENTION

The present invention provides a cyclical process for the regeneration of an adsorbent bed containing sulfur-oxidated compounds. The adsorbent bed is used to adsorb and separate sulfur-oxidated compounds from a hydrocarbonaceous stream to produce an adsorbent having adsorbed sulfur-oxidated compounds. The loaded adsorbent containing sulfur-oxidated compounds is purged with a liquid purge stream to remove interstitial hydrocarbonaceous compounds and then is desorbed with a desorbent to remove the sulfur-oxidated compounds. In a preferred embodiment, the desorbent remaining in the interstitial voids are purged with a hydrocarbonaceous stream containing sulfur-oxidated compounds. The resulting stream containing liquid purge and the interstitial hydrocarbonaceous compound, and, in one embodiment, the interstitial desorbent is introduced into a first lower end of a split shell fractionation zone. The resulting stream containing desorbent and sulfur-oxidated compounds is introduced into a second lower end of a split shell fractionation zone. The split shell fractionation zone produces a purge stream and a desorbent stream which are preferably recycled, and also a stream comprising sulfur-oxidated compounds and hydrocarbonaceous stream containing a reduced concentration of sulfur-oxidated compounds. In another preferred embodiment, at least a portion of the purge stream is used to regenerate a sulfur oxidation reaction zone.

Other embodiments of the present invention encompass further details such as feedstocks, adsorbents, desorbents, purge components and operating conditions, all of which are hereinafter disclosed in the following discussion of each of these facets of the invention.

BRIEF DESCRIPTION OF THE DRAWING

The drawing is a simplified schematic flow diagram of a preferred embodiment of the present invention.

DETAILED DESCRIPTION OF THE INVENTION

The present invention provides a process for the cyclical regeneration of an adsorbent bed containing sulfur-oxidated compounds. The adsorbent beds are utilized to remove sulfur-oxidated compounds from a hydrocarbonaceous feedstock containing sulfur-oxidated compounds. The hydrocarbonaceous feedstock containing sulfur-oxidated compounds contains distillable hydrocarbons boiling in the range from 149° C. (300° F.) to about 538° C. (1000° F.). a preferred product is diesel boiling range hydrocarbon streams containing less than about 50 ppm sulfur. The hydrocarbonaceous feedstock may be produced by any known method. In one case to desulfurize diesel boiling range hydrocarbons, the hydrocarbonaceous oil containing sulfur is subjected to oxygenation to convert the hydrocarbonaceous sulfur compounds to sulfur-oxidated compounds and then introduced into one or more adsorbent beds to retain the sulfur-oxidated compounds on the adsorbent and to produce diesel boiling range hydrocarbons having a reduced concentration of sulfur-oxidated compounds.

A suitable method for the production of diesel boiling range hydrocarbon containing sulfur-oxidated compounds is to react a diesel boiling range hydrocarbon with oxygen in the presence of a suitable catalyst to produce a diesel boiling range stream containing hydroperoxides which is subsequently reacted in the presence of a catalyst to generate and produce sulfur-oxidated compounds. Any suitable known catalyst or catalysts may be used to produce hydroperoxides and sulfur-oxidated compounds. A preferred catalyst comprises a supported transitional metal oxide. The sulfur-oxidated compounds are preferably produced in a catalytic reaction zone operated at a pressure from about 100 kPa (0 psig) to about 3551 kPa (500 psig) and a temperature from about 10° C. (50° F.) to about 170° C. (338° F.). During the catalytic production of the sulfur-oxidated compounds, the catalyst gradually becomes less active and must be regenerated in order to maintain maximum performance. In accordance with one embodiment of the present invention, the deactivated catalyst may be successfully regenerated by discontinuing the normal conversion process and contacting the catalyst with a suitable desorbent to remove adsorbed sulfur-oxidated compounds. The desorbent containing the sulfur-oxidated compounds is then introduced into a lower portion of a split shell fractionation zone to recover purified adsorbent and to recover sulfur-oxidated compounds. After the regeneration of the catalyst is complete, normal operation is resumed. The regeneration of the catalyst in the sulfur-oxidation reaction zone is preferably conducted at a temperature from about 10° C. (50° F.) to about 215° C. (420° F.) and a pressure from about 100 kPa (0 psig) to about 3551 kPa (500 psig).

The sulfur-oxidated compounds in the hydrocarbonaceous stream introduced into the adsorption zone are preferably present in an amount less than about 0.7 weight percent and more preferably less than about 0.6 weight percent. The resulting treated hydrocarbonaceous product preferably contains less than about 0.035 weight percent, (350 wppm) and, more preferably less than about 0.015 weight percent (150 wppm) sulfur-oxidated compounds. The sulfur-oxidated compounds are typically selected from the group consisting of sulfoxides and sulfones. Since the sulfur oxidated compounds contain only a small weight fraction of sulfur, the resultant treated hydrocarbonaceous products preferably contain less than about 50 wppm and more preferably less than about 10 wppm sulfur.

The hydrocarbonaceous stream containing sulfur-oxidated compounds is contacted with an adsorbent which selectively adsorbs sulfur-oxidated compounds to produce an adsorbent having adsorbed sulfur-oxidated compounds. Any suitable adsorbent maybe utilized in the process of the present invention. Preferred adsorbents include activated charcoal, hydrotalcite, ion exchange resin, zeolites, silica-alumina and silica gel. The contacting of the hydrocarbonaceous stream with the adsorbent is preferably conducted at conditions which include a temperature from about 25° C. (77° F.) to about 125° C. (257° F.), a pressure from about 1240 kPa (165 psig) to about 1825 kPa (250 psig) and a liquid hourly space velocity from about 5 hr$^{-1}$ to about 50 hr$^{-1}$. Although the contacting with the adsorbent may be conducted in any convenient manner, the adsorbent is preferably installed in a fixed bed and may then be contacted with in an upflow, downflow or radial flow fashion. When the resulting adsorbent begins to lose its ability to adsorb sulfur-oxidated compounds, it is considered to be spent and in need of regeneration. Spent adsorbent preferably contains from about 0.2 to about 2 weight percent sulfur-oxidated compounds. In a preferred embodiment, the adsorbent is contained in three or more beds with at least two beds being simultaneously operated in series and at least one bed being regenerated by solvent desorption In a preferred embodiment of the present invention, the spent adsorbent is contacted with a suitable desorbent to recover the sulfur-oxidated compounds and thereby regenerate the adsorbent. Any suitable desorbent may be used in accordance with the present invention. Preferred desorbents may be selected from pentane, hexane, benzene, toluene, xylene and mixtures thereof. The desorbent is preferably contacted with the spent adsorbent at a temperature in the range from about 43° C. (110° F.) to about 200° C. (392° F.) and a pressure to maintain the desorbent in the liquid phase. The desorbent is contacted with the adsorbent for a sufficient amount of time to remove at least a majority of the adsorbed sulfur-oxidated compounds. After regeneration, the adsorbent is then returned to service and contacted with a hydrocarbonaceous stream containing sulfur-oxidated compounds. The resulting desorbent containing desorbed sulfur-oxidated compounds is fractionated to produce a stream containing sulfur-oxidated compounds and a stream containing desorbent and having a reduced concentration of sulfur-oxidated compounds. The resulting regenerated desorbent stream is then preferably recycled for subsequent regenerations.

In another preferred embodiment of the present invention, before the spent adsorbent is contacted with the desorbent, the adsorbent bed containing interstitial hydrocarbons having a reduced concentration of sulfur-oxidated compounds is flushed or purged with a purge stream to recover valuable low sulfur hydrocarbons. The resulting purge stream containing hydrocarbons having a reduced concentration of sulfur-oxidated compounds is fractionated to produce a stream containing hydrocarbons having a reduced concentration of sulfur-oxidated compounds and a regenerated purge stream which may then be recycled. The purge stream may be any suitable liquid which effectively flushes or purges the void space in an adsorbent bed. The purge stream preferably is selected from pentane, hexane or admixtures thereof. It is also preferred that the purge stream boils in a range lower than the boiling range of the desorbent.

In the case when the desorbent regeneration is conducted with a purge step followed by a desorption step, the fractionation of the two separately generated steams may be fractionated in a single split shell fractionation zone to produce a regenerated purge stream, a regenerated desorbent stream, a stream containing sulfur-oxidated compounds and a stream containing hydrocarbons having a reduced concentration of sulfur-oxidated compounds.

A split shell fractionation zone is a fractionator which has a vertical dividing wall placed in the lower end of the fractionation zone and sealed between the wall and the outer shell to provide two separate spaces. The two spaces are each capable of containing a separate liquid which possesses different concentrations of components. The dividing wall extends upwardly from the bottom and ends part way up the height of the fractionator. The fractionator contains fractionation means, such as trays, plates or packing, for example. Each of the two spaces or compartments is open and communicates with the upper end of the fractionation zone. Each space is independently reboiled to maintain the desired separation.

In accordance with a preferred embodiment which utilizes a purge step prior to the desorbent step and the purge liquid boils in a temperature range lower than the boiling temperature range of the desorbent, a bed of spent adsorbent containing sulfur oxidative compounds is contacted with a purge stream to flush low sulfur liquid hydrocarbon and the resulting effluent is introduced into the low sulfur compartment of the split shell fractionation zone. Following the purge stream, a liquid desorbent stream is introduced into the bed of spent adsorbent to desorb sulfur oxidated compounds and the resulting effluent is introduced into the high sulfur compartment of the split shell fractionation zone.

The split shell fractionation zone is separately reboiled in both the low sulfur compartment and the high sulfur compartment, and is refluxed in a conventional manner. The purge component is flashed from the bottoms liquid held in the low sulfur compartment and is withdrawn as a liquid from an upper location in the fractionation zone. The desorbent component is flashed from the bottom liquid held in the high sulfur compartment and is withdrawn as a liquid from an upper location in the fractionation zone. The liquid purge stream draw point is located above the liquid desorbent stream draw point in the fractionation zone. A net liquid stream containing a low concentration of sulfur-oxidated compounds is removed from the low sulfur compartment and a net liquid stream containing a higher concentration of sulfur-oxidated compounds is removed from the high sulfur compartment. The recovered purge stream and desorbent steam may then be recycled to regenerate a newly spent adsorbent zone.

DETAILED DESCRIPTION OF THE DRAWING

In the drawing, the process of the present invention is illustrated by means of a simplified schematic flow diagram in which such details as pumps, instrumentation, heat-exchange and heat-recovery circuits, compressors and similar hardware have been deleted as being non-essential to an understanding of the techniques involved. The use of such miscellaneous equipment is well within the purview of one skilled in the art.

The process of the invention may be practiced while using multiple adsorption zones or adsorbent beds. The invention is exemplified by an adsorption zone containing three beds which are cyclically and sequentially regenerated by desorption with a desorbent.

Referring now to the drawing, a diesel boiling range hydrocarbon stream containing 350 weight ppm sulfur is introduced into the process via line 1 and is introduced into peroxide/sulfone generation zone 2. Air is introduced into the process via line 3 and a resulting oxygen depleted vent gas containing nitrogen is removed from peroxide/sulfone generation zone 2 via line 4. A resulting diesel boiling range hydrocarbon stream containing sulfur-oxidated compounds is removed from peroxide/sulfone generation zone 2 via line 5 and introduced into adsorption zone 6 containing adsorbent bed 7 and having interstitial desorbent from a previous regeneration. A resulting diesel boiling range hydrocarbon stream containing a reduced concentration of sulfur-oxidated compounds is removed from adsorption zone 6 and adsorbent bed 7 via line 10 and an initial portion of this effluent is transported via line 10 and introduced into low sulfur, lower end zone 26 contained in split shell fractionation zone 11 to remove and recover desorbent from a previous regeneration. After the initial flow has been completed by removing sufficient desorbent from a previous regeneration of adsorbent bed 7 contained in adsorption zone 6, the diesel boiling range hydrocarbon stream containing a reduced concentration of sulfur-oxidated compounds is transported via lines 20 and 22 and recovered as a low sulfur product. A purge stream containing a purge liquid and transported via line 12 from split shell fractionation zone 11 is introduced into an adsorbent bed 9 contained in adsorption zone 6 which adsorbent bed 9 contains adsorbent which is spent and contains sulfur-oxidated compounds. The purge stream sweeps the diesel boiling range hydrocarbons having a reduced concentration of sulfur-oxidated compounds from the void spaces surrounding the spent adsorbent in adsorbent bed 9 and the resulting admixture of the purge liquid and the diesel boiling range hydrocarbon is removed from adsorption zone 6 and adsorbent bed 9 via line 18 and introduced into low sulfur, lower end zone 26 contained in split shell fractionation zone 11. A liquid desorbent stream is carried via lines 13 and 14 from split shell fractionation zone 11 and introduced into adsorbent bed 8 contained in adsorption zone 6 which adsorbent bed 8 contains sulfur-oxidated compounds in order to desorb sulfur-oxidated compounds. An admixture of desorbent and sulfur-oxidated compounds is removed from a desorbent bed 8 contained in desorption zone 6 via lines 19 and 17 and introduced into high sulfur, lower end zone 27 of split shell fractionation zone 11. A liquid stream containing diesel boiling range hydrocarbons and a high concentration of sulfur-oxidated compounds is removed from high sulfur, lower end zone 27 via line 23 and recovered. A liquid hydrocarbonaceous stream containing diesel boiling range hydrocarbons having a low level of sulfur-oxidated compounds is removed from low sulfur, lower end zone 26 via line 21 and is recovered via lines 21 and 22. The bottom end of split shell fractionation zone 11 is divided into two compartments by partition 25. A number of fractionation trays are employed in the split shell fractionation zone 11 and are schematically represented by trays 24. A liquid desorbent stream is removed from split shell fractionation zone 11 via lines 13 and 14 and is introduced into adsorption zone 6 and adsorbent bed 8 as hereinabove described. A liquid purge material is removed from split shell fractionation zone 11 via line 12 and introduced into adsorption zone 6 and adsorbent bed 9 as hereinabove described. Another portion of the liquid desorbent stream is carried via lines 13 and 15 and introduced into peroxide/sulfone generation zone 2 in order to cyclically regenerate sulfone generation catalyst contained therein. A resulting stream containing desorbent and sulfur-oxidized compounds from the regeneration of the sulfone generation catalyst is removed from peroxide/sulfone generation zone 2 via line 16 and is subsequently carried via lines 16 and 17 and introduced into high sulfur, lower end zone 27 contained in split shell fractionation zone 11.

Adsorbent beds 7, 8 an 9 cycle through the three hereinabove described stages to provide cyclic adsorption and subsequent regeneration, and the drawing only shows a snapshot of the configuration at one point in time.

The process of the present invention is further demonstrated by the following illustrative embodiment. This illustrative embodiment is, however, not presented to unduly limit the process of this invention, but to further illustrate the advantage of the hereinabove-described embodiment. The following data were not obtained by the actual performance of the present invention but are considered prospective and reasonably illustrative of the expected performance of the invention.

ILLUSTRATIVE EMBODIMENT

A fresh feed stream of diesel boiling range hydrocarbons containing 350 wppm sulfur is introduced into a hydroperoxide generation zone containing a catalyst comprising a transition metal oxide and air at a rate of 1167 m³/hr. A gaseous stream of oxygen-depleted nitrogen containing gas is removed from the peroxide generation zone. A resulting diesel boiling range hydrocarbon stream containing hydroperoxide is then introduced into a sulfone generation zone containing a catalyst comprising a transition metal oxide to produce a diesel boiling range hydrocarbon stream containing sulfur-oxidated hydrocarbons including 350 wppm sulfur which is introduced into a newly regenerated adsorbent zone, which contains particulate adsorbent and liquid desorbent from a previous regeneration step. This flow rate is maintained for about five minutes and the effluent during this time is introduced into a low-sulfur bottom-end of a split shell fractionation zone. After the five minutes elapses and the liquid desorbent is flushed from the regenerated adsorbent zone, the effluent is then collected in a separate product storage tank and contains less than about 10 wppm of sulfur.

When the operating adsorbent zone becomes sufficiently loaded with sulfur-oxidated compounds and starts to adversely impact the sulfur level in the effluent product, the fresh feed stream is replaced by a purge stream containing hexane which flows at a rate of 256 m³/hr. for about 16 minutes to recover interstitial diesel boiling range hydrocarbons having a low sulfur concentration (less than about 10 wppm of sulfur) and is introduced into a low-sulfur bottom-end zone of a split shell fractionation zone. After the 16 minutes have elapsed, the purge stream is replaced by a desorbent stream which flows at a rate of 256 m³/hr. for about 40 minutes to desorb sulfur-oxidated compounds, thereby regenerating the adsorbent. The desorbent and desorbed sulfur-oxidated compounds mixture is introduced into the high-sulfur bottom-end zone of the fractionation zone. After the desorbent stream is discontinued, the adsorbent zone is deemed regenerated and returned to adsorbent service. The high-sulfur bottom-end zone and the low-sulfur bottom-end zone of the split shell fractionation zone are independently reboiled to vaporize the purge stream components and the desorbent stream components. A resulting liquid purge stream and a resulting liquid desorbent stream are removed from the fractionation zone at separate draw-off trays. A diesel stream containing 16 weight percent sulfur compounds in an amount of 12 m³/hr. is removed from the high-sulfur bottom-end zone and discarded. A diesel stream containing less than about 10 wppm sulfur compounds in an amount of 66 m³/hr. is removed from the low-sulfur bottom-end zone and directed to the product storage tank. The total amount of low sulfur diesel product recovered was about 1155 m³/hr. and contained less than about 10 wppm sulfur. When the sulfone generation catalyst in the sulfone generation zone begins to significantly lose activity due to adsorption of sulfur-oxidated compounds thereon, the fresh feed to the process is discontinued and the sulfone generation catalyst is contacted with a purge stream recovered from the fractionation zone to desorb sulfur-oxidated compounds. The resulting admixture of purge material and sulfur-oxidated compounds is removed from the sulfone regeneration zone and introduced into the high sulfur bottom end zone of the split shell fractionation zone to recover a regenerated purge stream and sulfur-oxidated compounds. After the regeneration of the sulfone generation catalyst by desorption of sulfur-oxidated compounds, the fresh feed may then be reintroduced into the process.

The foregoing description, drawing and illustrative embodiment clearly illustrate the advantages encompassed by the process of the present invention and the benefits to be afforded with the use thereof.

What is claimed is:

1. A process for the cyclical regeneration of an adsorbent bed containing sulfur-oxidated compounds which process comprises:
    (a) contacting an adsorbent bed with a hydrocarbonaceous stream containing sulfur-oxidated compounds to produce a first hydrocarbonaceous stream containing a reduced concentration of sulfur-oxidated compounds and an adsorbent bed containing sulfur-oxidated compounds and having interstitial hydrocarbons;
    (b) passing a liquid purge stream boiling at a temperature less than the interstitial hydrocarbons to purge the interstitial hydrocarbons from the adsorbent bed;
    (c) introducing a resulting effluent from step (b) into a first lower end of a split shell fractionation zone;
    (d) passing a desorbent stream into the adsorbent bed containing purge liquid to desorb sulfur-oxidated compounds;
    (e) introducing a resulting effluent from step (d) into a second lower end of a split shell fractionation zone;
    (f) recovering a liquid purge stream and a desorbent stream from the fractionation zone;
    (g) recovering a second hydrocarbonaceous stream containing a reduced concentration of sulfur-oxidated compounds from the first lower end of the split shell fractionation zone; and
    (h) recovering sulfur-oxidated compounds from the second lower end of the split shell fractionation zone.

2. The process of claim 1 wherein the hydrocarbonaceous stream containing sulfur-oxidated compounds boils in the range from about 149° C. (300° F.) to about 538° C. (1000° F.).

3. The process of claim 1 wherein the sulfur-oxidated compounds are selected from the group consisting of sulfoxides, sulfones and mixtures thereof.

4. The process of claim 1 wherein the adsorbent bed contains an adsorbent selected from the group consisting essentially of activated charcoal, hydrotalcite, ion exchange resin, zeolites, silica-alumina, silica gel and mixtures thereof.

5. The process of claim 1 wherein the adsorbent having adsorbed sulfur-oxidated compounds contains from about 0.2 to about 2 weight percent sulfur-oxidated compounds.

6. The process of claim 1 wherein the contacting in step (a) is conducted at a temperature from about 25° C. (77° F.) to about 125° C. (257° F.) and a pressure from about 1240 kPa (165 psig) to about 1825 kPa (250 psig).

7. The process of claim 1 wherein the desorbent in step (d) is introduced at a temperature from about 43° C. (110° F.) to about 125° C. (257° F.).

8. The process of claim 1 wherein the liquid purge stream comprises pentane, hexane or mixtures thereof.

9. The process of claim 1 wherein the desorbent stream comprises pentane, hexane, benzene, toluene, xylene or mixtures thereof.

10. The process of claim 1 wherein at least a portion of the desorbent stream recovered in step (f) is recycled to step (d).

11. The process of claim 1 wherein the hydrocarbonaceous stream containing sulfur-oxidated compounds comprises diesel boiling range hydrocarbons.

12. The process of claim 1 wherein at least a portion of the liquid purge stream recovered in step (f) is recycled to step (b).

13. The process of claim 1 wherein at least a portion of the desorbent stream recovered in step (f) is used to regenerate a sulfur oxidation reaction zone.

14. The process of claim 13 wherein the desorbent stream recovered after the regeneration of the sulfur oxidation reaction zone is introduced into the second lower end of the split shell fractionation zone.

15. The process of claim 13 wherein the resulting regeneration of the sulfur oxidation reaction zone is conducted at a temperature from about 10° C. (50° F.) to about 215° C. (420° F.) and a pressure from about 100 kPa (0 psig) to about 3551 kPa (500 psig).

16. A process for the regeneration of a spent catalyst in a sulfur oxidation reaction zone which process comprises:
  (a) passing a desorbent stream to the sulfur oxidation reaction zone to desorb sulfur-oxidated compounds from the catalyst and thereby regenerate the catalyst and produce a desorbent stream containing sulfur-oxidated compounds;
  (b) separating the desorbent stream containing sulfur-oxidated compounds from step (a) to produce as desorbent stream having a reduced concentration of sulfur-oxidated compounds and a stream rich in sulfur-oxidated compounds;
  (c) recycling at least a portion of the desorbent stream having a reduced concentration of sulfur-oxidated compounds to step (a); and
  (d) recovering the stream rich in sulfur-oxidated compounds.

17. The process of claim 16 wherein the catalyst comprises a supported transitional metal oxide.

18. The process of claim 16 wherein the regeneration of the catalyst in the sulfur-oxidation reaction zone is conducted at a temperature from about 10° C. (50° F.) to about 215° C. (420° F.) and a pressure from about 100 kPa (0 psig) to about 3551 kPa (500 psig).

19. The process of claim 16 wherein the desorbent stream comprises pentane, hexane, benzene, toluene, xylene or mixtures thereof.

20. The process of claim 16 wherein step (b) is conducted in a fractionation zone.

21. The process of claim 16 wherein the sulfur-oxidated compounds are selected from the group consisting of sulfoxides, sulfones and mixtures thereof.

22. A process for the cyclical regeneration of an adsorbent bed containing sulfur-oxidated compounds which process comprises:
  (a) contacting an adsorbent bed with a hydrocarbonaceous stream containing sulfur-oxidated compounds to produce a first hydrocarbonaceous stream containing a reduced concentration of sulfur-oxidated compounds and an adsorbent bed containing sulfur-oxidated compounds and having interstitial hydrocarbons;
  (b) passing a liquid purge stream boiling at a temperature less than the interstitial hydrocarbons to purge the interstitial hydrocarbons from the adsorbent bed;
  (c) introducing a resulting effluent from step (b) into a first lower end of a split shell fractionation zone;
  (d) passing a desorbent stream boiling at a temperature less than the interstitial hydrocarbons into the adsorbent bed containing purge liquid to desorb sulfur-oxidated compounds;
  (e) introducing a resulting effluent from step (d) into a second lower end of a split shell fractionation zone;
  (f) recovering a liquid purge stream and a desorbent stream from the fractionation zone;
  (g) passing at least a portion of the desorbent stream recovered in step (f) to a sulfur oxidation reaction zone during regeneration;
  (h) recovering a second hydrocarbonaceous stream containing a reduced concentration of sulfur-oxidated compounds from the first lower end of the split shell fractionation zone; and
  (i) recovering sulfur-oxidated compounds from the second lower end of the split shell fractionation zone.

23. The process of claim 22 wherein the desorbent stream recovered after the regeneration of the sulfur oxidation reaction zone is introduced into the second lower end of the split shell fractionation zone.

24. The process of claim 22 wherein the resulting regeneration of the sulfur oxidation reaction zone is conducted at a temperature from about 10° C. (50° F.) to about 215° C. (420° F.) and a pressure from about 100 kPa (0 psig) to about 3551 kPa (500 psig).

25. A process for the cyclical regeneration of an adsorbent bed containing sulfur-oxidated compounds which process comprises:
  (a) contacting an adsorbent bed with a hydrocarbonaceous stream containing sulfur-oxidated compounds to produce a first hydrocarbonaceous stream containing a reduced concentration of sulfur-oxidated compounds and an adsorbent bed containing sulfur-oxidated compounds and having interstitial hydrocarbons;
  (b) passing a liquid purge stream boiling at a temperature less than the interstitial hydrocarbons to purge the interstitial hydrocarbons from the adsorbent bed;
  (c) introducing a resulting effluent from step (b) into a first lower end of a split shell fractionation zone;
  (d) passing a desorbent stream boiling at a temperature less than the interstitial hydrocarbons into the adsorbent bed containing purge liquid to desorb sulfur-oxidated compounds;
  (e) introducing a resulting effluent from step (d) into a second lower end of a split shell fractionation zone;
  (f) recovering a liquid purge stream and a desorbent stream from the fractionation zone;
  (g) passing at least a portion of the desorbent stream recovered in step (f) to a sulfur oxidation reaction zone during regeneration;
  (h) passing at least a portion of the liquid purge stream recovered in step (f) to step (b);
  (i) passing at least a portion of the desorbent stream recovered in step (f) to step (d);
  (j) recovering a second hydrocarbonaceous stream containing a reduced concentration of sulfur-oxidated compounds from the first lower end of the split shell fractionation zone; and
  (k) recovering sulfur-oxide compounds from the second lower end of the split shell fractionation zone.

* * * * *